United States Patent
Cymbal et al.

(10) Patent No.: US 9,533,701 B2
(45) Date of Patent: Jan. 3, 2017

(54) STEERING COLUMN ASSIST SYSTEM

(75) Inventors: William D. Cymbal, Freeland, MI (US); Niklaus A. vonMatt, Midland, MI (US); Jeffrey E. Beyerlein, Frankenmuth, MI (US); John M. Andres, Saginaw, MI (US); Jason T. Rutkiewicz, Freeland, MI (US); Daniel J. Diffin, Saginaw, MI (US); Kevin C. Ross, Hemlock, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 13/568,756

(22) Filed: Aug. 7, 2012

(65) Prior Publication Data

US 2014/0041957 A1  Feb. 13, 2014

(51) Int. Cl.
| | | |
|---|---|---|
| *B62D 5/04* | (2006.01) |
| *F16C 23/10* | (2006.01) |
| *F16H 55/24* | (2006.01) |
| *F16C 19/06* | (2006.01) |
| *F16H 57/021* | (2012.01) |
| *F16H 57/022* | (2012.01) |

(52) U.S. Cl.
CPC ............. *B62D 5/0409* (2013.01); *F16C 23/10* (2013.01); *F16H 55/24* (2013.01); *F16C 19/06* (2013.01); *F16C 2361/61* (2013.01); *F16H 2057/0213* (2013.01); *F16H 2057/0224* (2013.01)

(58) Field of Classification Search
CPC ................... B62D 5/0409; F16H 57/12; F16H 2057/0224; F16H 2057/0213; F16C 23/10; F16C 23/105

USPC ..... 180/443, 444; 74/388 PS, 724, 353, 395, 74/406, 425, 427; 384/247, 255, 447, 276, 384/616, 903
See application file for complete search history.

(56) References Cited

U.S. PATENT DOCUMENTS 1,417,652 A * 5/1922 Wood ............................ 101/219
2,068,679 A * 1/1937 Hokansson ..................... 74/500
(Continued)

FOREIGN PATENT DOCUMENTS

| CN | 102083676 A | 6/2011 |
| CN | 102485570 A | 6/2012 |

(Continued)

OTHER PUBLICATIONS

Chinese Office Action for related Chinese Application No. 201310373128.8, Dated Jul. 6, 2015; 8 pages.
(Continued)

*Primary Examiner* — Anne Marie Boehler
(74) *Attorney, Agent, or Firm* — Cantor Colburn LLP

(57) ABSTRACT

A power-assisted steering system includes a control shaft arranged along a control shaft axis. An assist drive shaft defines a drive shaft axis and is arranged in a plane that is substantially transverse to the control shaft axis. The assist drive shaft is supported relative to the vehicle structure by a first bearing assembly and a second bearing assembly. A worm is disposed about the assist drive shaft. A worm gear is coupled to the control shaft, and the worm gear and control shaft are configured for rotation about the control shaft axis. The worm gear is configured for engaging the worm such that rotation of the worm and the assist drive shaft about the drive shaft axis causes rotation of the worm gear and the control shaft about the control shaft axis. The first bearing assembly is configured as an eccentric bearing assembly.

13 Claims, 5 Drawing Sheets

(56) References Cited

U.S. PATENT DOCUMENTS

| | | | |
|---|---|---|---|
| 2,069,143 A * | 1/1937 | Hammond, Jr. et al. | 74/500 |
| 4,035,044 A * | 7/1977 | Miyazaki | 384/447 |
| 4,569,423 A * | 2/1986 | Hirano | 254/343 |
| 4,666,317 A * | 5/1987 | Holthoff | 384/447 |
| 4,724,714 A | 2/1988 | Iwasaki et al. | |
| 6,164,407 A | 12/2000 | Cheng | |
| 6,357,313 B1 | 3/2002 | Appleyard | |
| 6,622,877 B2 * | 9/2003 | Plass | 212/312 |
| 6,763,738 B1 * | 7/2004 | Tsutsui et al. | 74/388 PS |
| 7,044,034 B2 * | 5/2006 | Hsien | 81/452 |
| 7,191,866 B2 | 3/2007 | Sasaki et al. | |
| 7,413,052 B2 * | 8/2008 | Sasaki et al. | 180/444 |
| 7,455,149 B2 * | 11/2008 | Segawa et al. | 180/444 |
| 8,302,255 B2 * | 11/2012 | Lin | 15/441 |
| 8,950,280 B2 | 2/2015 | Lescorail et al. | |
| 2004/0149512 A1 | 8/2004 | Tsutsui et al. | |
| 2004/0245040 A1 * | 12/2004 | Eda et al. | 180/444 |
| 2005/0133297 A1 | 6/2005 | Chikaraishi | |
| 2005/0235768 A1 | 10/2005 | Shimizu et al. | |
| 2005/0247514 A1 | 11/2005 | Heitzer | |
| 2007/0151378 A1 * | 7/2007 | Bareis et al. | 74/388 PS |
| 2010/0140011 A1 * | 6/2010 | Wilkes | F16C 23/06 180/444 |
| 2011/0067946 A1 * | 3/2011 | Kim | 180/444 |
| 2015/0197277 A1 | 7/2015 | Mehl et al. | |

FOREIGN PATENT DOCUMENTS

| | | |
|---|---|---|
| DE | 102005015451 A1 | 10/2006 |
| DE | 102007019324 A1 | 11/2007 |
| DE | 102011084510 A1 | 12/2012 |
| EP | 1452419 A1 | 9/2004 |
| EP | 1818242 A2 | 8/2007 |
| EP | 2695796 A2 | 2/2014 |
| JP | 2001322554 A | 11/2011 |
| KR | 20070116328 A | 12/2007 |
| WO | 2007144618 A1 | 12/2007 |

OTHER PUBLICATIONS

English Translation of Chinese Office Action for related Chinese Application No. 201310373128.8, Dated Jul. 6, 2015; 15 pages.
European Search Report for EP Application No. 13179562.7 dated Mar. 15, 2016.
Extended European Search Report for EP Application No. 16162246.9 dated Aug. 22, 2016.

* cited by examiner

STEERING COLUMN ASSIST SYSTEM

BACKGROUND OF THE INVENTION

The present invention relates generally to drive mechanisms for steering columns and more specifically to systems and methods for adjusting the position of a worm drive gear of a power assist steering system relative to a worm gear driven by the worm drive gear.

In many vehicles, a steering system includes a steering shaft (e.g., a steering wheel supported by a steering column and coupled to an intermediate steering shaft) whose rotation is linked to one or more steerable vehicle wheels. As the steering shaft is rotated, such as by an input from a vehicle operator or an automatic steering controller, the orientation of the one or more steerable vehicle wheels is changed so as to cause the direction of the vehicle to change. For example, vehicles commonly include a rack that is coupled to a pair of the vehicle's front wheels, with the rack being caused to move from side to side through the action of the intermediate steering shaft, which is caused to rotate about its central axis with rotation of the steering wheel.

Today's steering systems often include a power assist system to aid in rotating the intermediate steering shaft and therefore in moving the vehicle's steerable wheels from one orientation to another. In such systems, a torque assist system may include a hydraulic or electric drive mechanism (e.g., a torque-assist motor or pump) that applies a torque to a steering-assist drive shaft, causing the steering-assist drive shaft to rotate about its central axis. A worm may be disposed on the steering-assist drive shaft so as to facilitate application of a steering assist torque to a worm gear that is coupled to the intermediate steering shaft. The application of the torque assists in changing the orientation of the vehicle wheels. In such vehicle steering systems, which may include power assisted steering systems such as electric-assist power steering systems, the fit (i.e., meshing) between the worm and the worm gear can significantly impact the responsiveness and feel of the steering system as well as the amount of play (i.e., hysteresis) in the system. Accordingly, it is desirable to have a worm and worm gear combination with a close mesh (i.e., exhibiting small levels of clearance between gear teeth of the two components).

In production of large quantities of components, variations in critical dimensions may occur from one part to the next. As a result, without additional measures being taken to match individual components, undesirable variations in clearances between gear teeth of a particular worm and randomly chosen worm gear to be paired with that worm. To address such production variations, a number of techniques have been employed. One exemplary technique involves first assessing the dimensions (i.e., "sizing") individual worms and worm gears and then matching components to produce combinations with desirable fit characteristics (e.g., levels of clearance between the worm and teeth of the worm gear).

In accordance with this technique, worms may be machined to exacting tolerances and then classified into one of a plurality (e.g., twelve) of size classifications. Then, gears from complementary classes may be matched to produce combinations exhibiting desirable characteristics. Also, trial and error approaches may be used wherein gears are assembled, then removed, exchanged, and re-assembled until a desired fit is achieved. Unfortunately, these techniques can be costly, labor intensive, time consuming, and unreliable.

Accordingly, it would be desirable to have an improved system and method for assembling a worm and worm gear combination to produce a power-assisted steering system having a conveniently adjustable fit.

SUMMARY OF THE INVENTION

In an exemplary embodiment, a power-assisted steering system includes a control shaft arranged along a control shaft axis. An assist drive shaft defines a drive shaft axis and is arranged in a plane that is substantially transverse to the control shaft axis. The assist drive shaft is supported relative to the vehicle structure by a first bearing assembly and a second bearing assembly. A worm is disposed about the assist drive shaft. A worm gear is coupled to the control shaft, and the worm gear and control shaft are configured for rotation about the control shaft axis. The worm gear is configured for engaging the worm such that rotation of the worm and the assist drive shaft about the drive shaft axis causes rotation of the worm gear and the control shaft about the control shaft axis. The first bearing assembly is configured as an eccentric bearing assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
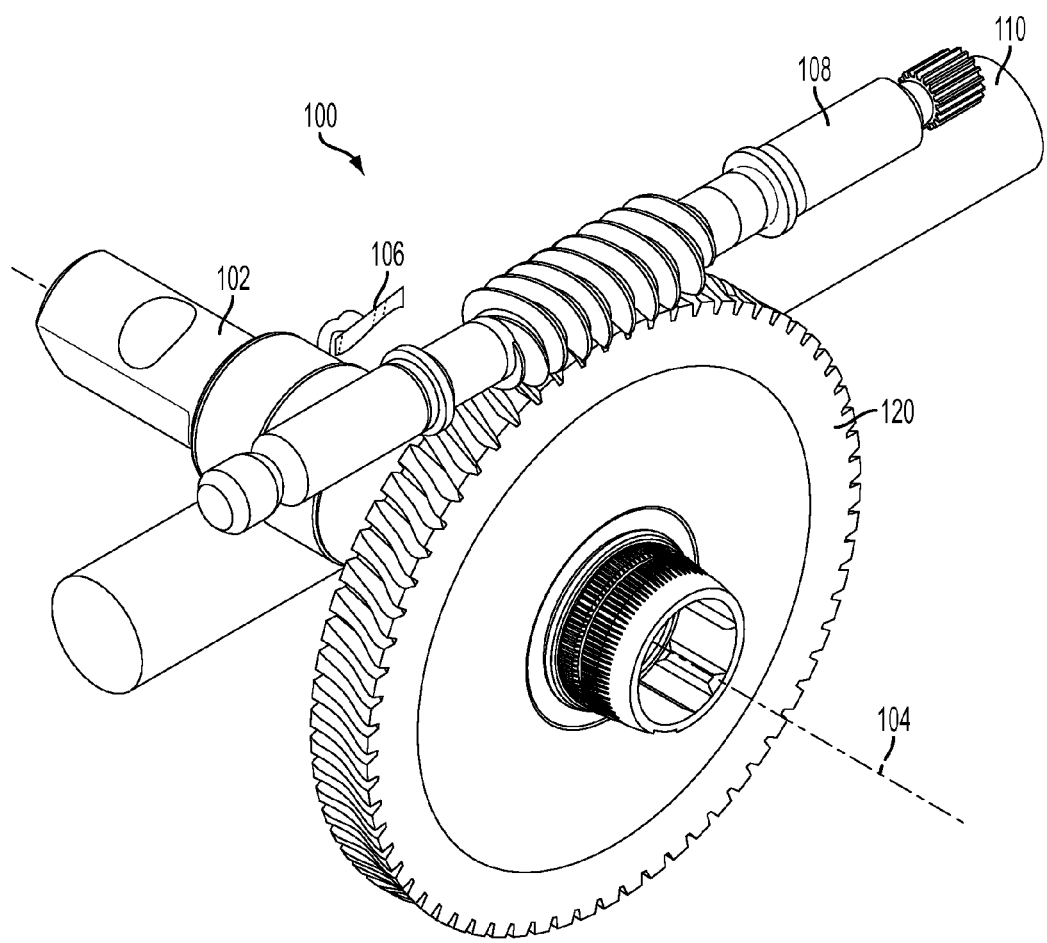
FIG. 1 illustrates a perspective view of a portion of an exemplary power-assisted steering system.

Referring now to the Figures, where the invention will be described with reference to specific embodiments, without limiting same, FIG. 1 illustrates a portion of an exemplary steering column assembly 100. As shown in FIG. 1, an exemplary power-assisted steering system 100 comprises a control shaft 102 that is arranged along a control shaft axis 104 and that is coupled to a vehicle structure 106 for rotation about the control shaft axis 104. An assist drive shaft 108 is arranged in an assist drive plane 110 that is substantially transverse to the control shaft axis 104. A worm gear 120 is coupled to (e.g., disposed on) the control shaft 102, and the worm gear 120 and control shaft 102 are configured for rotation about the control shaft axis 104. It should be appreciated that the worm gear 120 and control shaft 102 may be configured for rotation in response to a control input such as an operator-initiated rotation of an attached steering wheel, causing rotation of the control shaft 102 or the application of a torque upon the control shaft 102 by an automated steering control mechanism (not shown).

Figure 2:
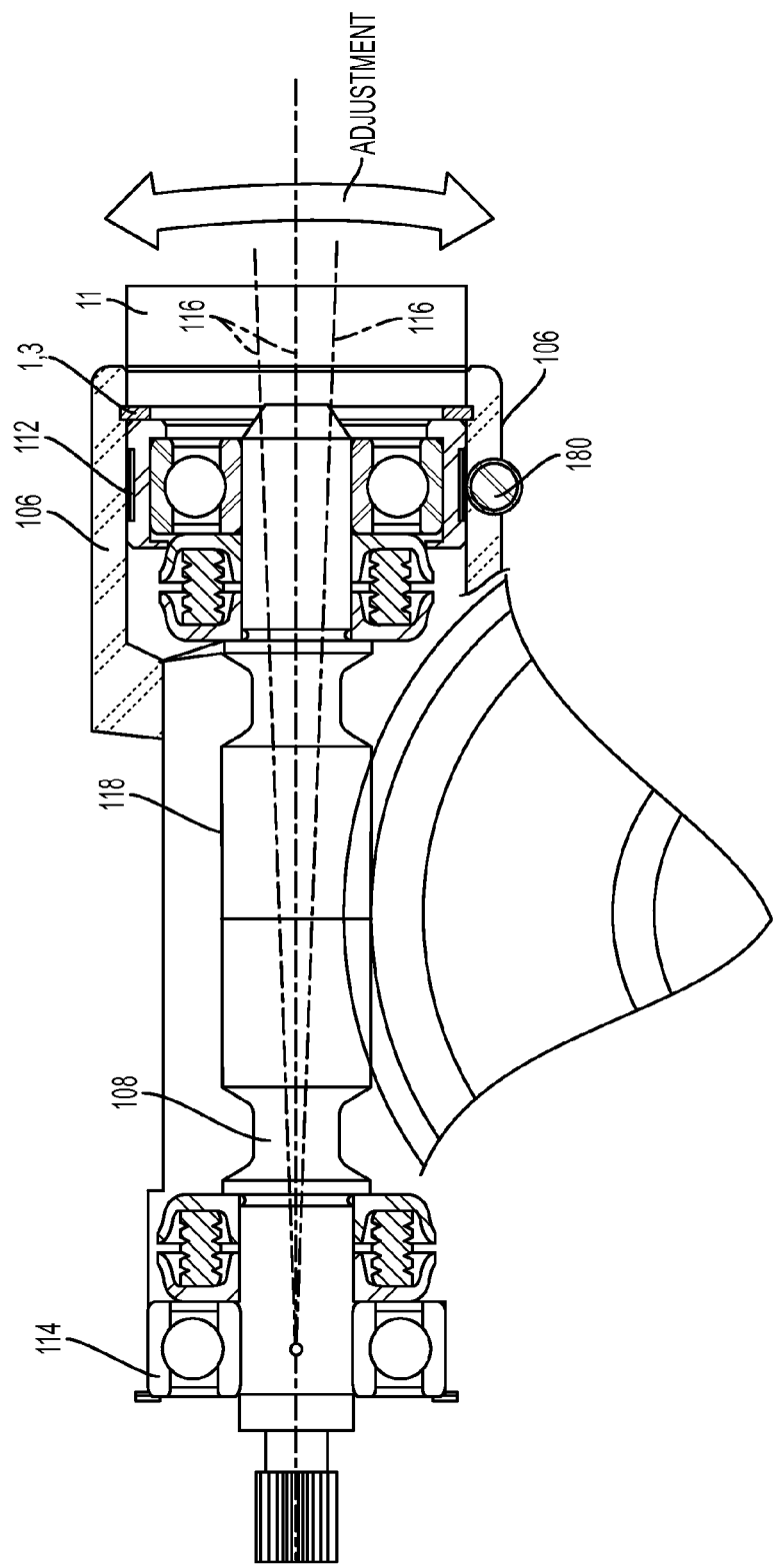
FIG. 2 illustrates a cutaway view of a portion of an exemplary power-assisted steering system.

As shown in FIG. 2, the assist drive shaft 108 is supported relative to the vehicle structure 106 by a first bearing assembly 112 and a second bearing assembly 114. The assist drive shaft 108 defines an assist drive shaft axis 116. A worm 118 is disposed, symmetrically about the assist drive shaft axis 116, on the assist drive shaft 108. In an exemplary embodiment, the worm 118 is disposed between the first bearing assembly 112 and the second bearing assembly 114.

As shown in FIG. 1, the worm 118 is configured for engaging the worm gear 120 such that rotation of the assist drive shaft 108, and therefore the worm 118, about the assist drive shaft axis 116, causes rotation of the worm gear 120, and therefore rotation of the control shaft 102, about the control shaft axis 104. In an exemplary embodiment, rotation of the control shaft 102 about the control shaft axis 104 causes a corresponding change in the orientation of at least one steerable vehicle wheel (nor shown).

Figure 3:
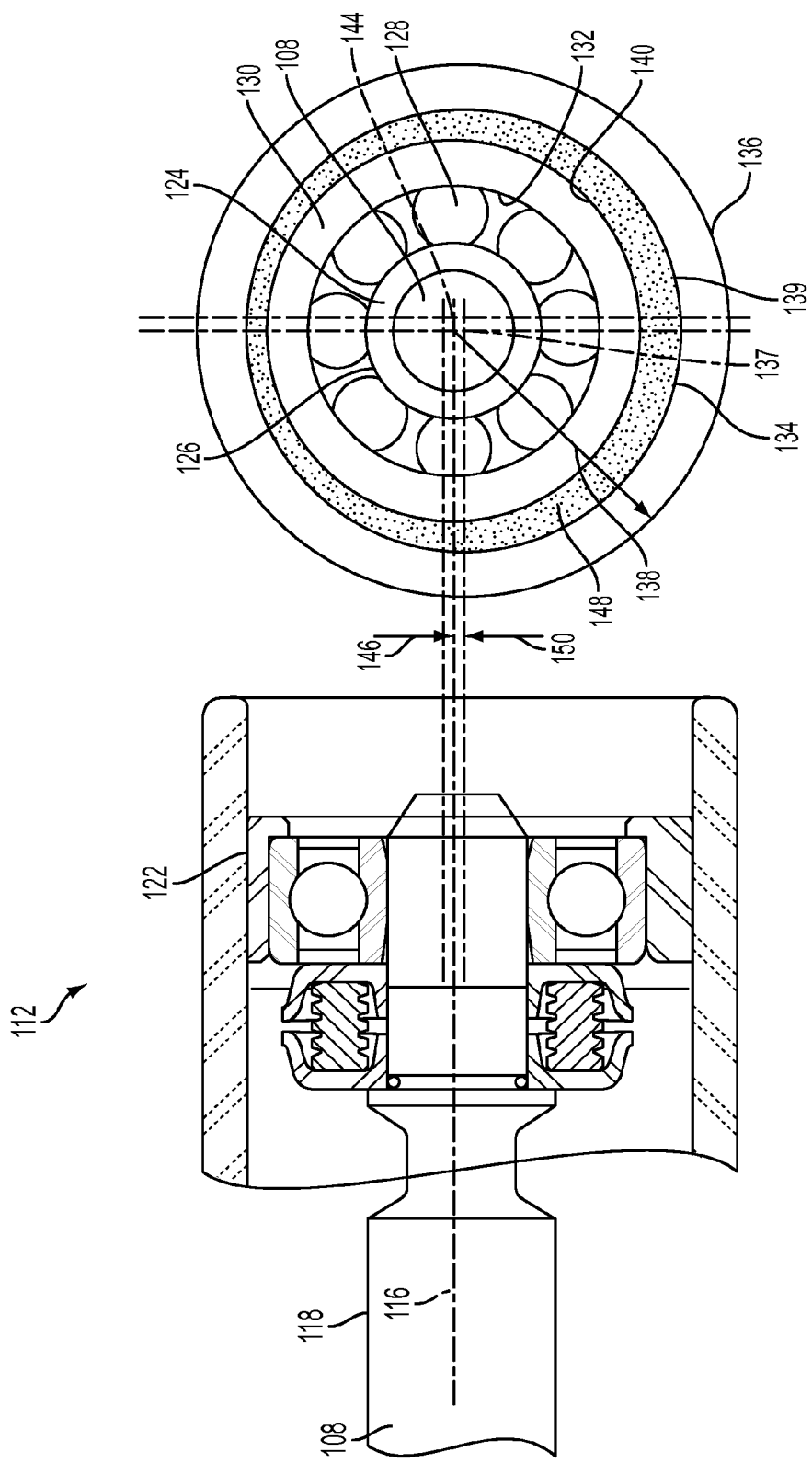
FIG. 3 illustrates a cutaway view of a portion of an exemplary power-assisted steering system.

As shown in FIG. 3, the first bearing assembly 112 is configured as an eccentric bearing assembly. Put another way, bearing assembly 112 is configured such that a position of an axis of rotation of the bearing assembly (i.e., the control shaft axis 104 about which the bearing assembly 112 is disposed and rotates) relative to an external surface 122 of bearing assembly 112 depends upon an angular orientation of one or more component of the bearing assembly. Accordingly, first bearing assembly 112 is configured such that the position of the axis of rotation 116 of the bearing assembly 112, relative to an external surface 122 of the bearing assembly 112, may be adjusted by modifying the orientation of one or more components of the bearing assembly 112. Since, in an exemplary embodiment, a position of the assist drive shaft axis 116 coincides with a position of the axis of rotation 116 of the first bearing assembly 112, and since the first bearing assembly 112 is configured as an eccentric bearing assembly, the position of the worm 118 in this embodiment may be adjusted by modifying the orientation of one or more components of the bearing assembly 112.

More specifically, in an exemplary embodiment as shown in FIG. 3, the first bearing assembly 112 is configured so as to maintain a position and orientation of the assist drive shaft axis 116 as the assist drive shaft 108 rotates about the assist drive shaft axis 116. The first bearing assembly 112 comprises a first bearing inner race 124, a first bearing 128, a first bearing outer race 130, and a first bearing housing 134. The first bearing inner race 124 is disposed about the assist drive shaft 108 and defines a radially-outward inner race surface 126 that has a substantially circular cross section disposed symmetrically about the assist drive shaft axis 116. The inner race surface 126 is suitable for facilitating movement of the first bearing 128 relative to and radially outward from the first bearing inner race 124 without causing substantial variation in the position of the assist drive shaft axis 116. It should be appreciated that the first bearing 128 may be any type of bearing known in the art, such as a ball bearing or a needle bearing or a roller bearing or a slide bearing. The first bearing outer race 130 is disposed radially outward from the first bearing 128 and defines a radially-inward outer race surface 132 that has a substantially circular cross section and that is also disposed symmetrically about the assist drive shaft axis 116.

The first bearing outer race 130 is disposed in a circular bearing receptacle 140 defined in the first bearing housing 134, which is configured to define an external mounting surface 136 for fixing a position of the first bearing housing 134, and the first bearing assembly 112, relative to the vehicle structure. The first bearing housing 134 is configured such that a center 144 of the circular bearing receptacle 140 is positioned apart from a ring center 137 of a round, radially outward surface 139 of an eccentric ring 148 of the first bearing housing 134. The eccentric ring 148 is rotatable about the assist drive shaft axis 116 and relative to the vehicle structure to which the first bearing housing 134 may be fixed. As a result, a radial distance 138 from the assist drive shaft axis 116 to the mounting surface 136 varies with position (i.e., angular orientation) about the assist drive shaft axis 116. Accordingly, a position of the assist drive shaft axis 116 relative to the vehicle structure can be adjusted by rotating the eccentric ring 148 of the first bearing housing 134 about the assist drive shaft axis 116.

In an exemplary embodiment, as shown in FIG. 3, the ability of the first bearing housing 134 to provide for adjustability of the radial distance 138 from the assist drive shaft axis 116 to the mounting surface 136 (e.g., by modulating the position (i.e., angular orientation) of the eccentric ring 148 about the assist drive shaft axis 116) causes the first bearing assembly 112 to operate as an eccentric bearing assembly. This adjustability of the position of the assist drive shaft axis 116 is facilitated by the first bearing housing 134 defining its circular bearing receptacle 140 about a center 144 that is apart from (i.e., separated a finite distance from) the ring center 137 of the radially outward surface 139 of the eccentric ring 148 of the first bearing housing 134.

In operation, as the eccentric ring 148 of the first bearing housing 134 is rotated about the ring center 137 of the radially outward surface 139 of the eccentric ring 148, the center 144 of the circular bearing receptacle 140 moves about the ring center 137 of the of the radially outward surface 139 of the eccentric ring 148, which corresponds to the center of the first bearing housing 134. Accordingly, a position of the assist drive shaft axis 116 relative to the vehicle structure can be adjusted by rotating the eccentric ring 148 of the first bearing housing 134 about the assist drive shaft axis 116. In this way, the eccentric bearing assembly 112 provides an adjustment range 146 for the assist drive shaft axis 116 and the worm 118 positioned thereon.

It should be appreciated that providing only a single eccentric ring 148 facilitates adjustments to the position of the assist drive shaft axis 116 in a first direction, such as the vertical direction 150, wherein the extent to which the position of the assist drive shaft axis 116 can be moved depends upon the adjustment range 146 (i.e., the extent of the eccentricity inherent in the first bearing housing 134). It should also be noted, however, that as the eccentric ring 148 of the first bearing housing 134 rotates about the assist drive shaft axis 116, the position of the assist drive shaft axis 116 moves not only along the vertical direction 150, but also in a direction that is perpendicular to the vertical direction 150. Accordingly, as first bearing housing 134 rotates about the assist drive shaft axis 116, in addition to changes in the position of the assist drive shaft axis 116 in the vertical direction 150, the assist drive shaft axis 116 also moves in a direction perpendicular to the vertical direction 150.

Figure 4:
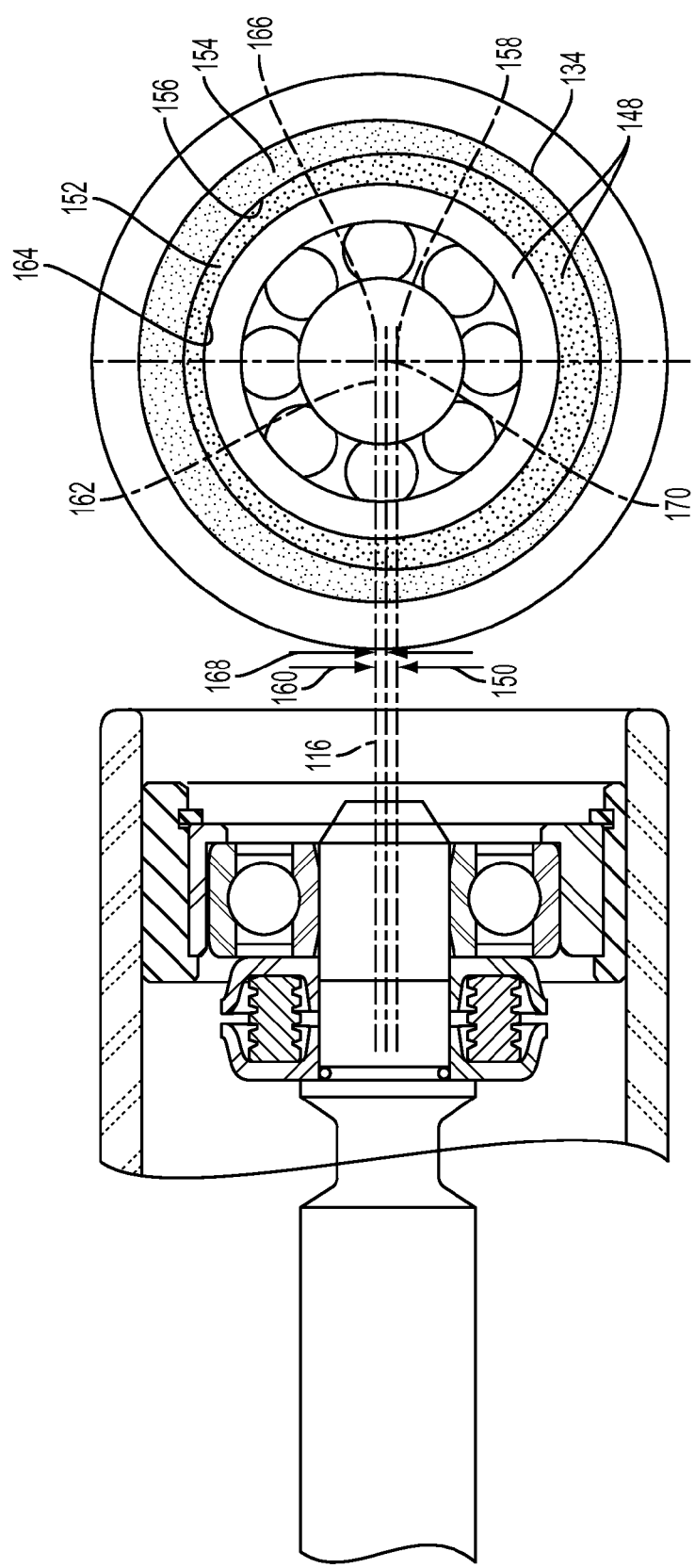
FIG. 4 illustrates a cutaway view of a portion of an exemplary power-assisted steering system.

To address the above-described coupling of movements of the assist drive shaft axis 116 in these two directions, in an exemplary embodiment as shown in FIG. 4, an exemplary first bearing housing 134 comprises a plurality of nested eccentric rings 148 (e.g., a double eccentric arrangement). This configuration facilitates accumulation of adjustment contributions made by each of the nested eccentric rings 148. Accordingly, deviations in a first direction, such as the vertical direction 150, may be reinforced by contributions in the vertical direction 150 from each of the nested eccentric rings 148, while contributions from each of the nested eccentric rings 148 in an orthogonal direction may be configured so as to oppose one another and cancel.

More specifically, as shown in FIG. 4, a first bearing housing 134 comprises a nested housing 152 and a nesting housing 154. The nesting housing 154 defines a circular nesting receptacle 156 disposed symmetrically about a nesting receptacle center 158. The nesting receptacle center 158 is positioned a finite distance 160 from a center 162 of the nesting housing 154 as defined by its radially outward circular surface. The nested housing 152 is disposed within the nesting receptacle 156 of the nesting housing 154. As the nesting housing 154 is rotated about the center 162 of the nesting housing 154, the nesting receptacle center 158, and the nested housing 152 disposed within the nesting receptacle 156 of the nesting housing 154, moves about the center 162 of the nesting housing 154.

The nested housing 152 defines a circular nested receptacle 164 disposed symmetrically about a nested receptacle center 166. The nested receptacle center 166 is positioned a finite distance 168 from a center 170 of the nested housing 152 as defined by its radially outward circular surface. As the nested housing 152 is rotated within the nesting housing 154, the nested receptacle center 166 moves about the center 170 of the nested housing 152. Accordingly, a first bearing housing 134 configured with a plurality of nested eccentric rings 148 may provide for cancellation of adjustment contributions in a first direction while reinforcing adjustment contributions in a second direction such as by rotating a nested housing in a different direction from that of a nesting housing.

It should be appreciated that the second bearing assembly 114 may also be configured as an eccentric bearing assembly. Accordingly, the system and method described herein facilitates adjustments to the position of the assist drive shaft axis 116 and the worm 118 positioned thereon.

Figure 5:
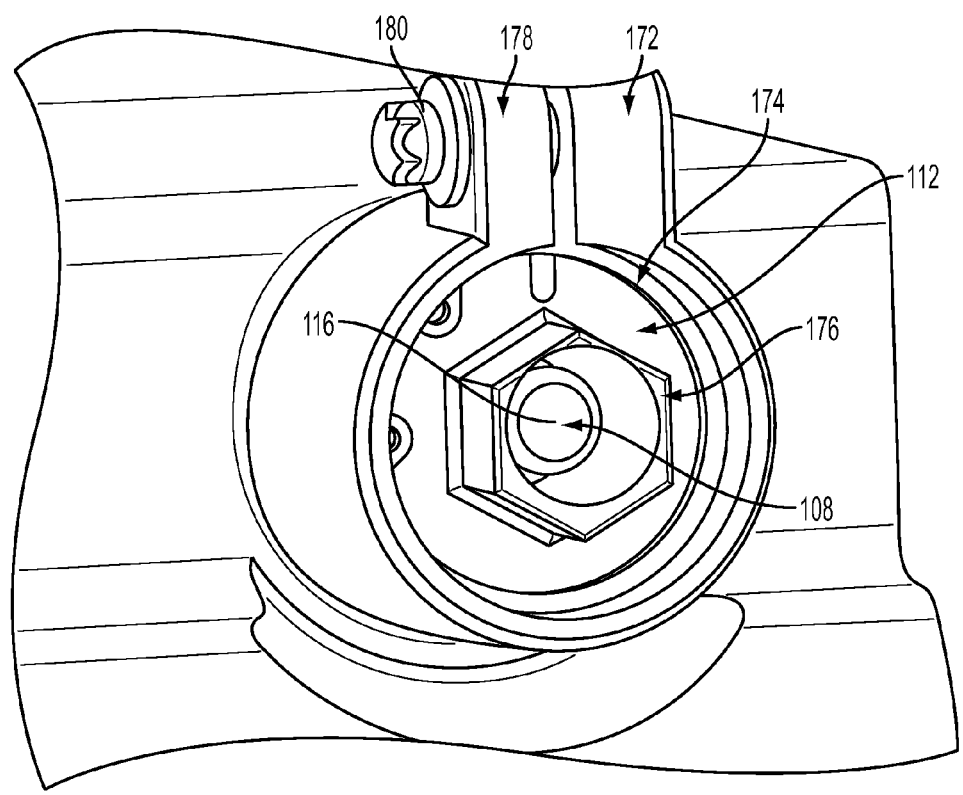
FIG. 5 illustrates a cutaway view of a portion of an exemplary power-assisted steering system.

As shown in FIG. 5, in an exemplary embodiment, a first bearing assembly 112 is retained within a steering-assist drive housing 172 by a snap ring 174. A hexagonal drive retainer 176 facilitates rotation of an eccentric ring 148 (FIG. 1) and adjustment of a position of a worm 118 (disposed on an assist drive shaft 108 (FIG. 1) relative to a worm gear 120 (FIG. 1). While the hexagonal drive retainer 176 is used to facilitate rotation of the eccentric ring 148 (FIG. 3), the assist drive shaft 108 (FIG. 1) is driven by a steering assist motor (not shown) until a predetermined criteria relating to the proper positioning of the worm is met. Exemplary criteria include achievement of a desired clearance between the worm 118 and the worm gear 120, achievement of a desired level of force between the worm gear 120 and the worm 118, or achievement desired level of effort (i.e. resistance torque) due to the interaction between the worm 118 and the worm gear 120. Once the desired criteria is met, a clamp 178 is activated so as to fix the position of the of the eccentric ring 148 (FIG. 3) and the assist drive shaft axis 116 (FIG. 1) relative to the control shaft axis 104 and therefore the position of the worm 118 relative to the worm gear 120. Axial force of the worm 118 along the assist drive shaft axis 116 is resisted by the snap ring 174.

In an exemplary embodiment, various mechanisms may be implemented to facilitate adjustment of the eccentric ring 148. For example, a bolt 180 may be configured so as to facilitate manipulation of the eccentric ring 148. In accordance with one such embodiment, the eccentric ring 148 is configured with a series of teeth arranged around its circumference positioned so as to interact with the threads of the bolt 180. As the bolt is rotated, the threads of the bolt interact with the teeth of the eccentric ring 148, causing it to rotate. In an exemplary embodiment, the mesh of the bolt 180 to the eccentric ring 148 is configured to provide a 110:1 drive ratio, which has been found to provide a relatively smooth and reliable method of adjusting the eccentric ring with precision.

In operation, in an adjustment mode, the nut is engaged to the bolt 180 with only minimal torque so that the bolt 180 remains free to rotate. Once the worm 118 and bearing 112 are installed into the steering-assist drive housing 172, the worm 118 is rotated by the motor (not shown) while the bolt 180 is also rotated, causing the eccentric ring 148 to rotate, which causes the position of the worm 118 to be adjusted. Once the desired position of the eccentric ring 148 and the worm 118 are obtained, the nut is driven, relative to the bolt 180, to a sufficient torque to fix the position of the eccentric ring 148.

Thus, the present invention provides an improved system and method for assembling a worm and worm gear combination to produce a power-assisted steering system having a conveniently adjustable fit. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power-assisted steering system comprising:
a control shaft arranged along a control shaft axis and coupled to a vehicle structure for rotation about the control shaft axis;
an assist drive shaft arranged in a plane that is substantially transverse to the control shaft axis, the assist drive shaft being supported relative to the vehicle structure by a first bearing assembly and a second bearing assembly and defining a drive shaft axis;
a worm disposed about the assist drive shaft; and
a worm gear coupled to the control shaft, the worm gear and control shaft being configured for rotation about the control shaft axis;
the worm gear is configured for engaging the worm such that rotation of the worm and the assist drive shaft about the drive shaft axis causes rotation of the worm gear and the control shaft about the control shaft axis;
the first bearing assembly is retained within the vehicle structure by a snap ring disposed about the first bearing assembly, the first bearing assembly is configured as an eccentric bearing assembly comprising a plurality of nested eccentric rings comprising a first eccentric housing and a second eccentric housing, the second eccentric housing is nested within the first eccentric housing; and
the first eccentric housing and the second eccentric housing are configured to provide for cancellation of adjustment contributions in a first direction while providing for reinforcement of adjustment contributions in a second direction that is orthogonal to the first direction when the first eccentric housing is rotated in opposition to a rotation of the second eccentric housing;

further comprising a drive retainer positioned and configured for facilitating rotation of the first eccentric housing and the second eccentric housing as the assist drive shaft is driven about the drive shaft axis until a predetermined criteria relating to the proper positioning of the worm is met;

the drive retainer is configured as a bolt having threads, the threads being disposed and configured so as to interact with teeth disposed on the first eccentric housing such that the drive retainer is configured for causing the first eccentric housing to rotate about the drive shaft axis, wherein the drive retainer further facilitates rotation of the second eccentric housing the second eccentric housing is arranged so as to interact with the drive retainer such that as the drive retainer is rotated, the first eccentric housing and the second eccentric housing are caused to rotate.

2. A power-assisted steering system as in claim 1, wherein the first bearing assembly comprises a first bearing housing that defines a circular bearing receptacle having a center wherein a first eccentric ring of the first bearing housing includes a radially outward surface that defines a ring center; wherein the center of the circular bearing receptacle is positioned apart from the ring center.

3. A power-assisted steering system as in claim 2, wherein the first eccentric ring is rotatable about an assist drive shaft axis defined by the assist drive shaft.

4. A power-assisted steering system as in claim 2, wherein the first bearing housing is fixed to the vehicle structure.

5. A power-assisted steering system as in claim 3, wherein a radial distance from the assist drive shaft axis to a mounting surface varies with position about the assist drive shaft.

6. A power-assisted steering system as in claim 3, wherein a position of the assist drive shaft axis relative to the vehicle structure can be adjusted by rotating the first eccentric ring about the assist drive shaft axis.

7. A power-assisted steering system as in claim 3, wherein the first bearing housing defines a circular bearing receptacle about a center that is separated a finite distance from the ring center.

8. A power-assisted steering system as in claim 3, wherein the assist drive shaft axis moves in two directions as the first bearing housing rotates about the assist drive shaft axis.

9. A power-assisted steering system as in claim 1, wherein the first eccentric housing is configured such that a first rotation of the first eccentric housing causes a first deviation in the drive shaft axis, the first deviation having a primary component in a primary direction and a secondary component in a secondary direction that is transverse to the primary direction;

wherein the second eccentric housing is configured such that a second rotation of the second eccentric housing causes a second deviation in the drive shaft axis, the second deviation having a primary component in the primary direction and a secondary component in the secondary direction; and wherein the first eccentric housing and the second eccentric housing are configured such that the primary component of the first deviation is equal to the primary component of the second deviation when the first rotation is equal in magnitude and opposite in direction relative to the second rotation.

10. A power-assisted steering system as in claim 9, wherein the first eccentric housing and the second eccentric housing are configured such that the secondary component of the first deviation is substantially opposite to the secondary component of the second deviation when the first rotation is equal in magnitude and opposite in direction relative to the second rotation.

11. A power-assisted steering system as in claim 1, wherein the vehicle structure comprises a steering-assist drive housing.

12. A power-assisted steering system as in claim 1, further comprising a clamp positioned and configured to fix a position of the first eccentric housing and a position of the second eccentric housing when the predetermined criteria is met.

13. The power-assisted steering system as in claim 1;

wherein the first eccentric housing defines a circular nesting receptacle disposed symmetrically about a first housing center that is positioned a first distance from a center of the first eccentric housing;

wherein the second eccentric housing is disposed within the nesting receptacle disposed symmetrically about a second housing center that is positioned a second distance from a center of the second eccentric housing; and wherein the first distance is equal to the second distance.

* * * * *